(12) United States Patent
Arao et al.

(10) Patent No.: US 9,366,832 B2
(45) Date of Patent: Jun. 14, 2016

(54) OPTICAL CONNECTION STRUCTURE

(71) Applicant: SUMITOMO ELECTRIC INDUSTRIES, LTD., Osaka-shi, Osaka (JP)

(72) Inventors: Hajime Arao, Yokohama (JP); Tomomi Sano, Yokohama (JP); Sho Yakabe, Yokohama (JP); Michiko Harumoto, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/674,158

(22) Filed: Mar. 31, 2015

(65) Prior Publication Data

US 2015/0286016 A1 Oct. 8, 2015

(30) Foreign Application Priority Data

Apr. 8, 2014 (JP) .................................. 2014-079459

(51) Int. Cl.
*G02B 6/42* (2006.01)
*G02B 6/43* (2006.01)

(52) U.S. Cl.
CPC ............ *G02B 6/4246* (2013.01); *G02B 6/4292* (2013.01); *G02B 6/43* (2013.01); *G02B 6/425* (2013.01); *G02B 6/4206* (2013.01); *G02B 6/4214* (2013.01)

(58) Field of Classification Search
CPC .. G02B 6/4206; G02B 6/4214; G02B 6/4246; G02B 6/425; G02B 6/4292; G02B 6/43
USPC ................................ 385/33, 47, 88, 89, 92, 93
See application file for complete search history.

(56) References Cited

U.S. PATENT DOCUMENTS

| | | | |
|---|---|---|---|
| 6,973,248 B2 | 12/2005 | Kropp | |
| 2006/0239605 A1* | 10/2006 | Palen | G02B 6/4206 385/14 |
| 2010/0135618 A1 | 6/2010 | Howard et al. | |
| 2012/0093462 A1 | 4/2012 | Childers et al. | |
| 2013/0170795 A1* | 7/2013 | Wu | G02B 6/32 385/58 |

FOREIGN PATENT DOCUMENTS

| | | |
|---|---|---|
| JP | 2006-067360 A | 3/2006 |
| JP | 2008-151843 A | 7/2008 |
| JP | 2010-020085 A | 1/2010 |
| JP | 2010-122456 A | 6/2010 |
| JP | 4559327 B2 | 10/2010 |
| JP | 4730274 B2 | 7/2011 |
| JP | 4910788 B2 | 4/2012 |

\* cited by examiner

*Primary Examiner* — Ryan Lepisto
(74) *Attorney, Agent, or Firm* — Drinker Biddle & Reath LLP (57) ABSTRACT

An optical connection structure comprising: a substrate including a main surface and an optical waveguide in which a beam is incident or emitted in a direction intersecting with the main surface; a receptacle including a first lens and a connector guide and disposed on the substrate such that the first lens and the optical waveguide are optically coupled; and an optical connector including a second lens and a guide unit and holding an optical fiber so as to be optically coupled with the second lens, wherein: the receptacle and the optical connector are configured to be detachably through the connector guide and the guide unit; and the first lens and the second lens are optically coupled by mounting the optical connector to the receptacle.

10 Claims, 9 Drawing Sheets

OPTICAL CONNECTION STRUCTURE

TECHNICAL FIELD

The present invention relates to an optical connection structure.

BACKGROUND

An optical transmission circuit apparatus that enables high-speed signal transmission between boards is disclosed in Japanese Patent Application Laid-Open No. 2006-067360. This apparatus comprises a bottom plate in which the boards are arrayed, and an optical transmission circuit that connects these boards is provided in the bottom plate. The optical transmission circuit comprises a tape-like optical fiber bundle, an optical divergence unit, and an optical connection unit. The optical fiber bundle is formed by arraying optical fibers in parallel. The optical divergence unit is connected with the optical fiber bundle and changes the direction of light that propagates in the optical fibers. The optical connection unit is connected with the optical divergence unit and a photoelectricity conversion circuit mounted on the board. The optical transmission circuit propagates an optical signal in the width direction of the bottom plate and change an optical path upward by the optical divergence unit, thereby propagating the optical signal to the photoelectricity conversion circuit.

SUMMARY

An optical printed circuit board having an optical waveguide is studied as a circuit board used for an HPC (high performance computer), and so on. Optical communication through an optical fiber is performed between circuit boards. The optical waveguide and the optical fiber are optically connected by coupling a receptacle provided on a circuit board and an optical connector provided on one end of the optical fiber. However, since tolerance is caused by attaching and detaching the optical connector and the receptacle, the optical axis of the optical fiber and the optical axis of the optical waveguide shift, and the optical coupling efficiency decreases.

An optical connection structure according to the present invention comprises: a substrate including a main surface and an optical waveguide in which a beam is incident or is emitted in a direction intersecting with the main surface; a receptacle including a first lens and a connector guide and disposed on the substrate such that the first lens and the optical waveguide are optically coupled; and an optical connector including a second lens and a guide unit and holding an optical fiber so as to be optically coupled with the second lens, where: the receptacle and the optical connector are configured to be detachable through the connector guide and the guide unit; and the first lens and the second lens are optically coupled by mounting the optical connector to the receptacle.

Moreover, another optical connection structure according to the present invention comprises: a substrate including a main surface, a receiving optical waveguide in which a reception beam is incident in a direction intersecting with the main surface, a transmitting optical waveguide in which a transmission beam is emitted in the direction intersecting with the main surface, a light receiving element receiving the reception beam from the receiving optical waveguide and a light emitting element providing the transmission beam to the transmitting optical waveguide; a receptacle including a receiving first lens, a transmitting first lens, and a connector guide and disposed on the substrate such that the receiving first lens is optically coupled with the receiving optical waveguide and the transmitting first lens is optically coupled with the transmitting optical waveguide; and an optical connector including a receiving second lens, a transmitting second lens, and a guide unit, holding a receiving optical fiber so as to be optically coupled with the receiving second lens, and holding a transmitting optical fiber so as to be optically coupled with the transmitting second lens, where: the receptacle and the optical connector are configured to be detachable through the connector guide and the guide unit; and, by mounting the optical connector to the receptacle, the receiving first lens and the receiving second lens are optically coupled and the transmitting first lens and the transmitting second lens are optically coupled.

DETAILED DESCRIPTION

A specific example of an optical connection structure according to an embodiment of the present invention is described below with reference to the drawings. Here, the present invention is not limited to these exemplifications and is shown by the claims, and it is intended that all changes within the meaning and range equivalent to the claims are included. In the following explanation, the same reference numerals are assigned to the same components in the description of drawings, and overlapping explanation is omitted.

Figure 1:
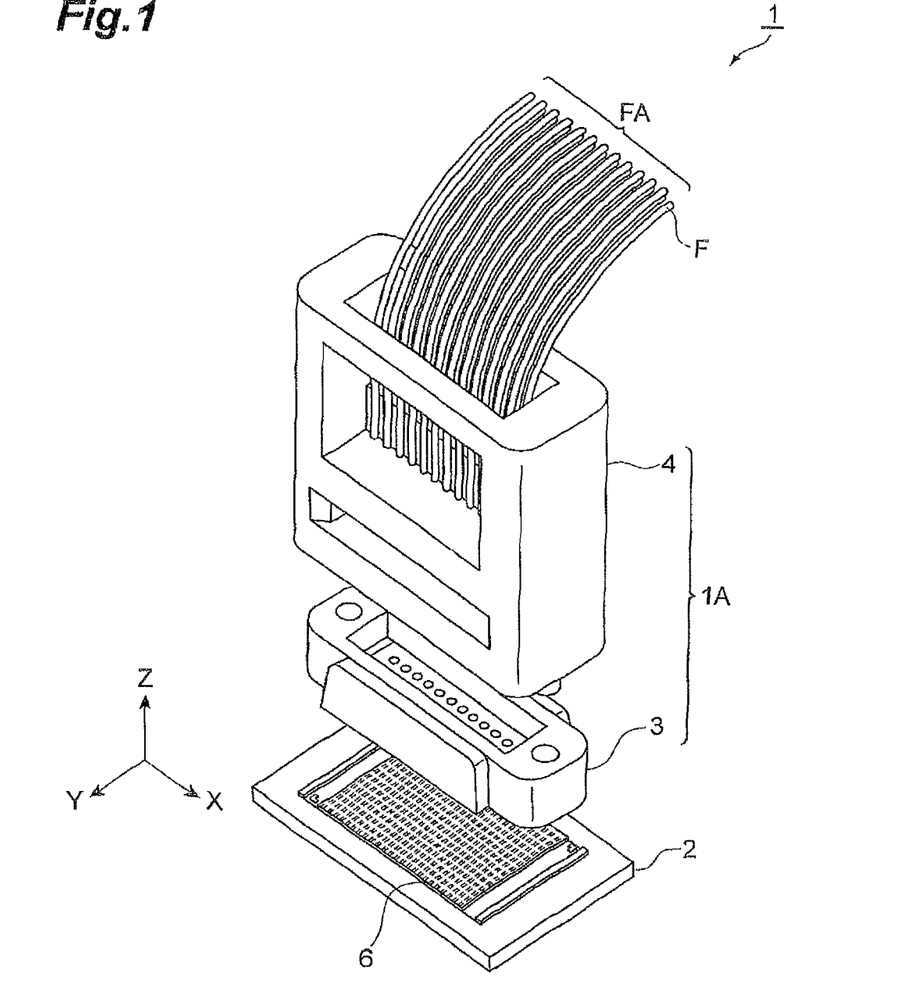
FIG. 1 is an exploded perspective view that illustrates the configuration of an optical module comprising an optical connection structure according to the present embodiment.

FIG. 1 is an exploded perspective view that illustrates the configuration of an optical module 1 comprising an optical connection structure according to the present embodiment. An XYZ rectangular coordinate system is illustrated in FIG. 1 for ease of understanding. The optical module 1 comprises an optical substrate 2, a receptacle 3, and an optical connector 4.

The optical substrate 2 extends along the XY plane, such that a plurality of planar optical waveguides 6 extend in the Y direction. In the optical substrate 2, a photoelectric conversion element is mounted so as to be optically coupled with the optical waveguide 6. The plurality of optical waveguides 6 may be formed by etching a semiconductor substrate. Alternatively, the plurality of optical waveguides 6 may be formed with resin provided on a dielectric substrate.

An optical connection structure 1A of the present embodiment includes the receptacle 3 and the optical connector 4. The receptacle 3 is disposed on the optical substrate 2. The receptacle 3 has a plurality of first lenses 15 optically coupled with the plurality of optical waveguides 6 respectively. The optical connector 4 holds a fiber array FA including a plurality of optical fibers F arrayed in the X direction and the Y direction. The optical connector 4 has a plurality of second lenses optically coupled with the plurality of optical fibers F respectively. The second lenses are disposed on the front surface of the optical connector 4, and the optical fibers F are introduced from the rear surface. The optical connector 4 is formed so as to be detachable with respect to the receptacle 3. By mounting the optical connector 4 to the receptacle 3, the optical waveguide 6 and the optical fiber F are optically coupled via the first lens 15 and the second lens.

In the optical module 1 of the present embodiment, one end of the fiber array FA is optically coupled with the optical waveguide 6 formed on the optical substrate 2 through the optical connector 4. Further, the other end of the fiber array FA is optically coupled with the optical waveguide 6 formed on another optical substrate 2 through another optical connector 4. Therefore, a certain optical substrate 2 and another optical substrate 2 can be optically connected by the optical module 1. Moreover, the optical module 1 comprises a reception unit that propagates signal light from the optical connector 4 to the optical substrate 2, and a transmission unit that propagates signal light from the optical substrate 2 to the optical connector 4. Here, "transmission" denotes a mode in which the signal light is output to the outside of the optical substrate 2 through the optical connector 4, and "reception" denotes a mode in which the signal light is input from the outside to the optical substrate 2 through the optical connector 4.

Figure 2:
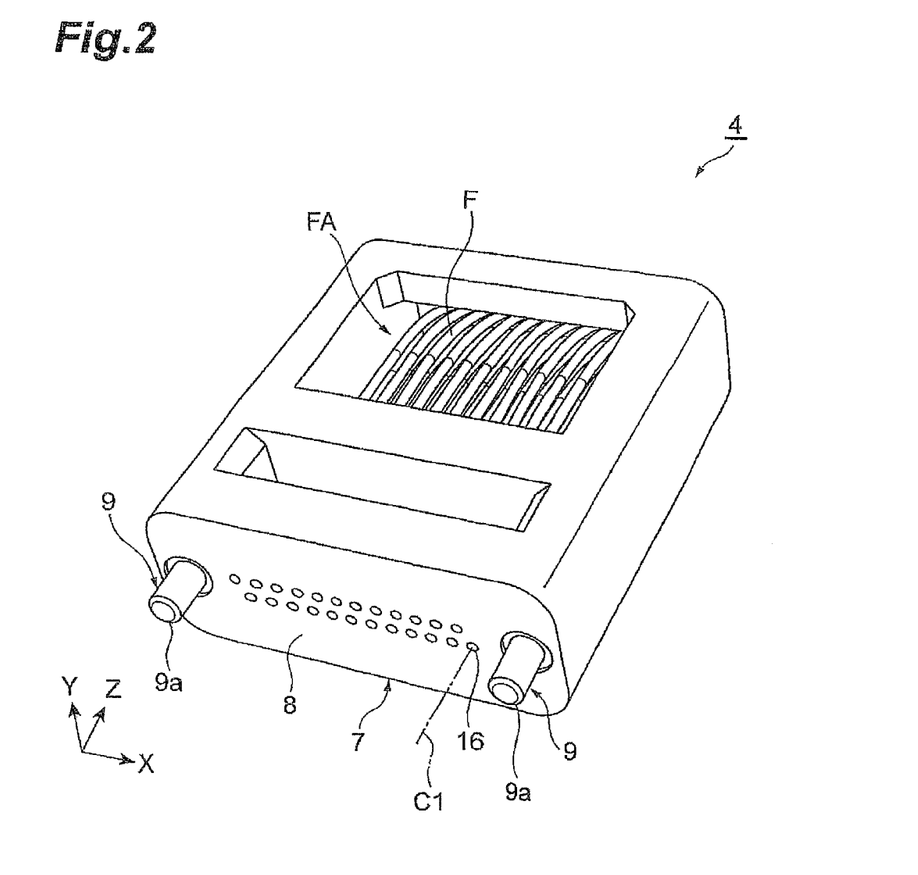
FIG. 2 is a perspective view in which an optical connector unit is seen from the diagonally lower side.

FIG. 2 is a diagram in which the optical connector 4 is seen from the diagonally lower side. The optical connector 4 has an attachment unit 7, and the optical connector 4 is attached to the receptacle 3 in a state where the attachment unit 7 faces the receptacle 3. The incidence surface 8 and a pair of guide units 9 are formed on the attachment unit 7. The incidence surface 8 extends along the XY plane that intersects with an optical axis C1 of the optical fiber F. A plurality of second lenses 16 are formed on the incidence surface 8. The second lenses 16 are provided on the optical axis C1 of the optical fiber F. The pair of guide units 9 sandwich the incidence surface 8 in the X direction. The guide unit 9 includes a columnar guide pin 9a that projects in the Z direction. It is preferable that the optical connector 4 is integrally formed with resin transparent to signal light.

Figure 3:
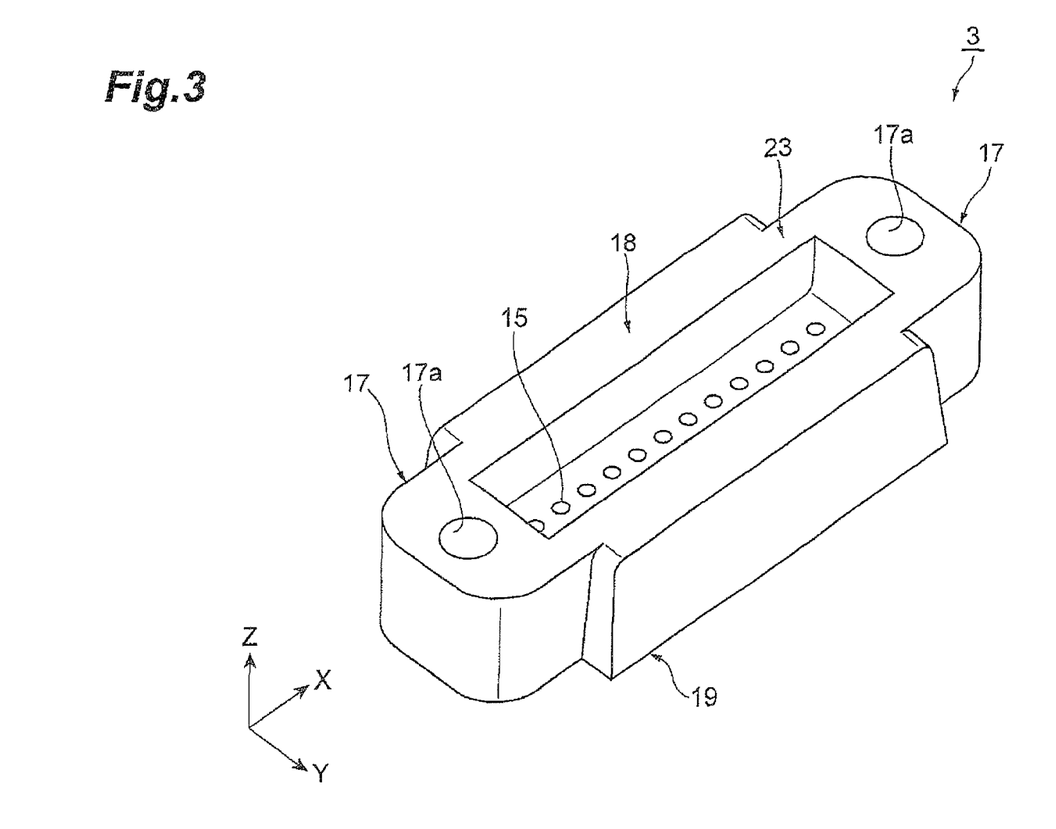
FIG. 3 is a perspective view that expands and illustrates a receptacle unit.

FIG. 3 is a perspective view that expands and illustrates the receptacle 3. The receptacle 3 has the plurality of first lenses 15. The receptacle 3 is adhered to the optical substrate 2 and fixes the optical connector 4 to the optical substrate 2.

The receptacle 3 comprises a body unit 23 and a connector guide 17. The body unit 23 is sandwiched by the connector guide 17 in the X direction. The connector guide 17 has a pair of guide holes 17a. The pair of guide holes 17a have an internal diameter in which the guide pin 9a can be held, and are formed at the substantially same intervals with the guide pin 9a in the X direction. The receptacle 3 may be integrally formed with resin transparent to signal light.

The body unit 23 has a connection unit 18 and a mounting unit 19. The connection unit 18 is connected with the optical connector 4 so as to face the attachment unit 7. The connection unit 18 has the plurality of first lenses 15 disposed so as to respectively correspond to the plurality of second lenses 16 of the optical connector 4 in one-to-one correspondence. The mounting unit 19 faces the optical substrate 2. The connection unit 18 and the mounting unit 19 are disposed along the Z direction when the receptacle 3 is attached to the optical substrate 2.

Figure 4:
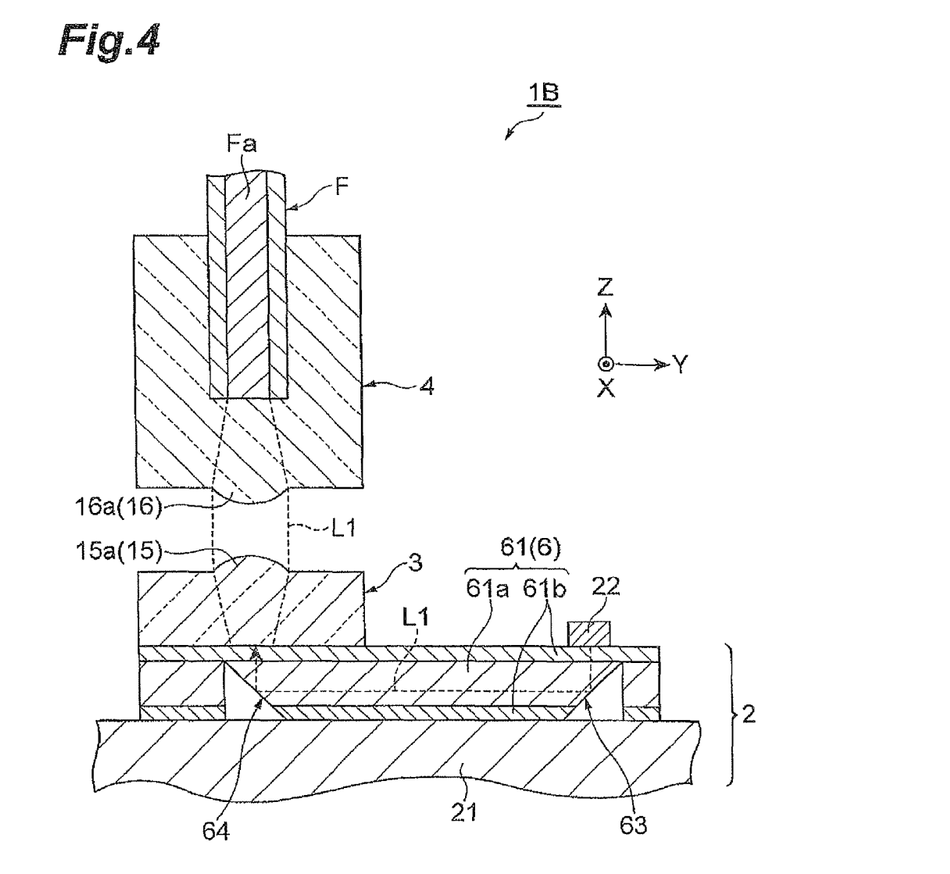
FIG. 4 is a Y-Z cross-sectional view that typically illustrates the configuration of a transmission unit of an optical module.

FIG. 4 is a YZ cross-sectional view that typically illustrates the configuration of a transmission unit 1B of the optical module 1. The transmission unit 1B comprises the optical substrate 2, the receptacle 3, and the optical connector 4. The optical substrate 2 comprises a main surface 21, a plurality of transmitting optical waveguides 61 formed on the main surface 21, and a light emitting element 22 disposed on the transmitting optical waveguide 61. The light emitting element 22 is, for example, a VCSEL (Vertical Cavity Surface Emitting Laser). The receptacle 3 is disposed on the transmitting optical waveguide 61 and comprises the plurality of first lenses 15. The first lens 15 has a transmitting first lens 15a optically connected with the light emitting element 22. The optical connector 4 comprises the plurality of second lenses 16 and comprises a transmitting second lens 16a optically connected so as to face the transmitting first lens 15a in the Z direction. The transmitting optical waveguide 61 includes a core 61a that propagates light and a clad 61b that covers the core 61a. Two mirrors 63 and 64 are formed in the transmitting optical waveguide 61. The mirror 63 is disposed so as to face the light emitting element 22 in the Z direction, and reflects transmission light L1 emitted from the light emitting element 22 and leads it to the transmitting optical waveguide 61.

The mirror 64 is disposed so as to face the transmitting first lens 15a in the Z direction, and reflects the transmission light L1 reflected by the mirror 63 toward the transmitting first lens 15a. The transmitting first lens 15a collimates the transmission light L1 and emits it toward the transmitting second lens 16a. The transmitting second lens 16a converges the transmission light L1 and couples it with a core Fa of the transmitting optical fiber F. The light emitting element 22 and the transmitting optical fiber F are optically coupled through the mirrors 63 and 64, the transmitting optical waveguide 61, the transmitting first lens 15a, and the transmitting second lens 16a in such a manner.

Figure 5:
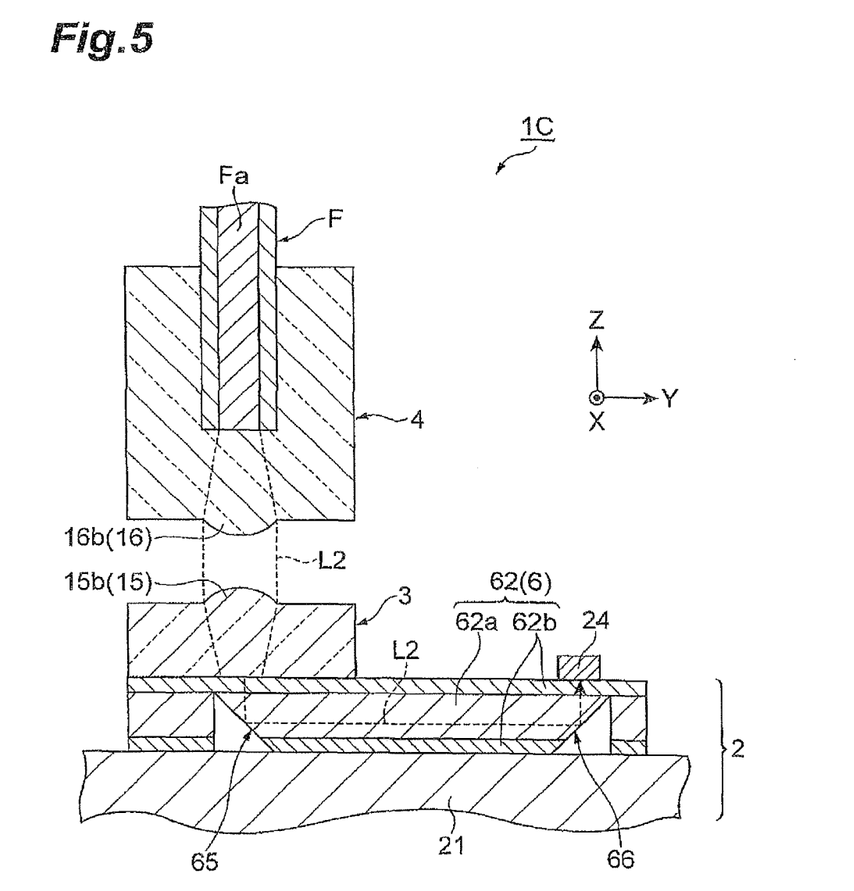
FIG. 5 is a Y-Z cross-sectional view that typically illustrates the configuration of a reception unit of an optical module.

FIG. 5 is a YZ cross-sectional view that typically illustrates the configuration of a reception unit 1C of the optical module 1. The reception unit 1C comprises the optical substrate 2, the receptacle 3, and the optical connector 4 which are common with the transmission unit 1B. The optical substrate 2 comprises the main surface 21, a plurality of receiving optical waveguides 62 formed on the main surface 21, and a light receiving element 24 disposed on the receiving optical waveguide 62. The light receiving element 24 is, for example, a photodiode. The receptacle 3 is disposed on the receiving optical waveguide 62 and comprises the plurality of first lenses 15. The first lens 15 has a receiving first lens 15b optically connected with the light receiving element 24. The optical connector 4 comprises the plurality of second lenses 16, and comprises a receiving second lens 16b optically connected so as to face the receiving first lens 15b in the Z direction. The receiving optical waveguide 62 includes a core 62a that propagates light and a clad 62b that covers the core 62a. Two mirrors 65 and 66 are formed in the receiving optical waveguide 62. Receiving light L2 is emitted from the receiving optical fiber F. The receiving second lens 16b collimates the receiving light L2 and emits it toward the receiving first lens 15b. In one example, numerical aperture (NA) of the receiving optical fiber F is substantially equal to NA of the transmitting optical fiber F. The focal length of the receiving second lens 16b is substantially equal to the focal length of the transmitting second lens 16a.

The receiving first lens 15b receives the receiving light L2 from the receiving second lens 16b, and converges and emits it to the receiving optical waveguide 62. In one example, the focal length of the receiving first lens 15b is substantially equal to the focal length of the transmitting first lens 15a. NA of the receiving optical waveguide 62 is substantially equal to NA of the transmitting optical waveguide 61.

The mirror 65 is disposed so as to face the receiving first lens 15b in the Z direction. The receiving optical waveguide 62 and the receiving first lens 15b are optically coupled through the mirror 65, where the receiving light L2 from the receiving first lens 15b is reflected and led to the receiving optical waveguide 62. The mirror 66 is disposed so as to face the light receiving element 24 in the Z direction, and reflects and leads the receiving light L2 to the light receiving element 24. By this means, the transmitting optical fiber F and the light receiving element 24 are optically coupled through the mirrors 65 and 66, the receiving optical waveguide 62, the receiving first lens 15b, and the receiving second lens 16b.

Figure 6A:
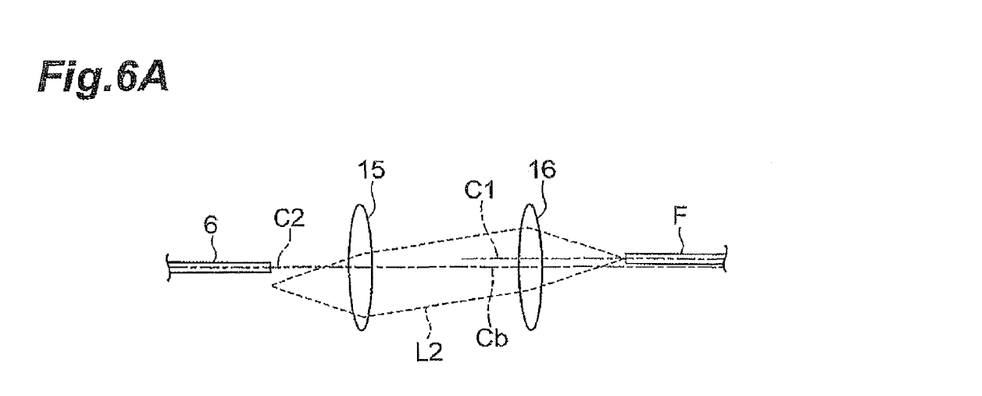
FIG. 6A typically illustrates a state where an optical waveguide and an optical fiber are optically coupled through the first lens and the second lens.
Figure 6B:
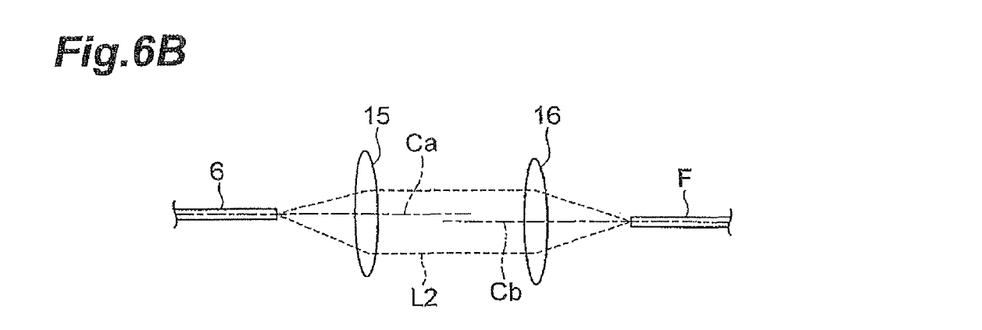
FIG. 6B typically illustrates a state where an optical waveguide and an optical fiber are optically coupled through the first lens and the second lens.

FIG. 6A and FIG. 6B typically illustrate a state where the optical waveguide 6 and the optical fiber F are optically coupled by the first lens 15 and the second lens 16 in the reception unit 1C. As illustrated in FIG. 6A, if the optical axis C1 of the optical fiber F greatly shifts from an optical axis Cb of the second lens 16, the optical axis of the receiving light L2 emitted from the second lens 16 inclines. As a result, the light convergence position of the receiving light L2 emitted from the first lens 15 greatly shifts from an optical axis C2 of the optical waveguide 6. Even in the transmission unit 1B, similarly, if the optical axis of the optical waveguide 6 greatly shifts from the optical axis of the first lens 15, the optical axis of the transmission light L1 emitted from the optical waveguide side lens 15 inclines. As a result, the light convergence position of the transmission light L1 emitted from the second lens 16 greatly shifts from the optical axis C1 of the optical fiber F.

By contrast with this, as illustrated in FIG. 6B, if an optical axis Ca of the first lens 15 and the optical axis Cb of the second lens 16 are shifted while the optical axis C1 of the optical fiber F and the optical axis Cb of the second lens 16 are substantially matched and the optical axis C2 of the optical waveguide 6 and the optical axis Ca of the first lens 15 are substantially matched, the optical axis is not inclined between the first lens 15 and the second lens 16. As a result, in the reception unit 1C, the shift amount of the light convergence position of the receiving light L2 emitted from the first lens 15 from the optical axis C2 of the optical waveguide 6 becomes small. Similarly, in the transmission unit 1B, the shift amount of the light convergence position of the transmission light L1 emitted from the second lens 16 from the optical axis C1 of the optical fiber F becomes small. Since the first lens 15 is provided in the receptacle 3 in the optical connection structure 1A of the present embodiment, the optical axis C2 of the optical waveguide 6 and the optical axis Ca of the first lens 15 are substantially matched. Moreover, since the second lens 16 is provided in the optical connector 4, the optical axis C1 of the optical fiber F and the optical axis Cb of the second lens 16 are substantially matched. Therefore, the boundary between the receptacle 3 and the optical connector 4 is located between the first lens 15 and the second lens 16. As a result, when the optical connector 4 is detached from the receptacle 3, even if the optical axis Ca of the first lens 15 and the optical axis Cb of the second lens 16 are shifted by tolerance caused between a guide hole 17a and the guide pin 9a, a decrease in optical coupling efficiency between the optical fiber F and the optical waveguide 6 is suppressed. The tolerance caused between the guide hole 17a and the guide pin 9a is, for example, about 3 μm. When the optical fiber F and the optical waveguide 6 with their core diameter about 50 μm to 80 μm are used, even if tolerance of about 10 μm to 20 μm is caused between the guide hole 17a and the guide pin 9a, a decrease in optical coupling efficiency is sufficiently suppressed.

Moreover, NA of the transmitting optical waveguide 61 and NA of the receiving optical waveguide 62 may be substantially equal, NA of the transmitting optical fiber F and NA of the receiving optical fiber F may be substantially equal, the focal length of the transmitting first lens 15a and the focal length of the receiving first lens 15b may be mutually equal and the focal length of the transmitting second lens 16a and the focal length of the receiving second lens 16b may be mutually equal. By this means, the transmitting optical fiber F and the receiving optical fiber F may be assumed to be common. Moreover, the transmitting first lens 15a and the receiving first lens 15b may be assumed to be common. Moreover, the transmitting second lens 16a and the receiving second lens 16b may be assumed to be common. Moreover, the transmitting optical waveguide 61 and the receiving optical waveguide 62 may be formed with a common process. Therefore, the optical connection structure 1A may be easily manufactured.

First Modification Example

Figure 7A:
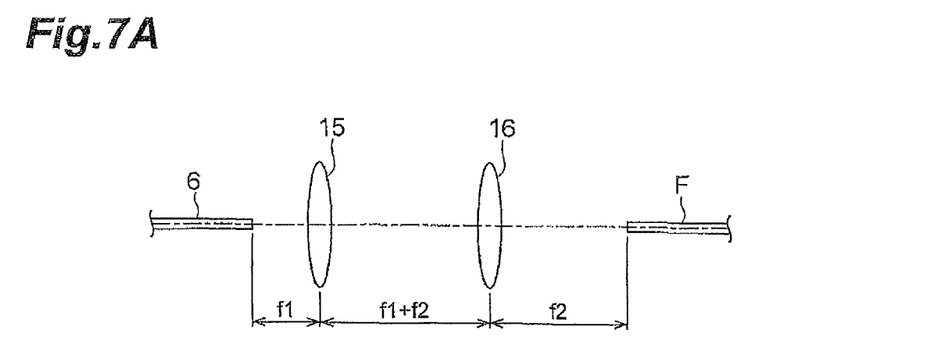
FIG. 7A describes one example of the focal length of each of the first lens and the second lens.

FIG. 7A is a diagram to describe one example of a focal length f1 of the first lens 15 and a focal length f2 of the second lens 16. The focal length f2 of the second lens 16 may be larger than the focal length f1 of the first lens 15. The ratio (f1:f2) of the focal length f1 and the focal length f2 is, for example, 1.0:1.6. As the lens focal length is larger, the inclination of light emitted from the lens is smaller when the optical axis of the optical fiber F or the optical waveguide 6 and the optical axis of the lens are shifted, and therefore the influence on the optical coupling efficiency may be reduced. Since the receptacle 3 is placed on the flat optical substrate 2, the optical axis adjustment between the first lens 15 and the optical waveguide 6 may be easy. Meanwhile, since the optical connector 4 holds the optical fiber F to a columnar hole, the optical axis adjustment between the second lens 16 and the optical fiber F may be difficult. Therefore, since the focal length f2 of the second lens 16 is larger than the focal length f1 of the first lens 15, the optical coupling efficiency between the optical fiber F and the optical waveguide 6 may be improved.

The gap between the optical axis C2 of the optical waveguide 6 and the optical axis Ca of the first lens 15 may be equal to or less than 5 μm. When the receptacle 3 is mounted on the optical waveguide 6, the optical axis C2 of the first lens 15 and the optical axis Ca of the optical waveguide 6 may easily be adjusted by observing an expansion image of the optical waveguide 6 from the first lens 15.

Second Modification Example

Figure 7B:
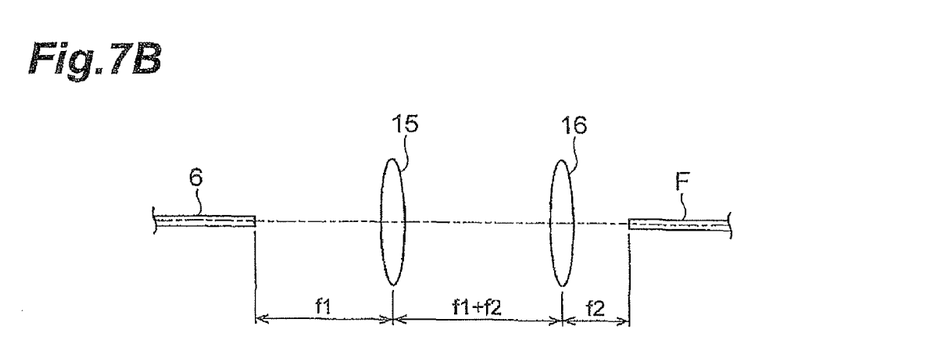
FIG. 7B describes another example of the focal length of each of the first lens and the second lens.

FIG. 7B is a diagram to describe another example of the focal length f1 of the first lens 15 and the focal length f2 of the second lens 16. The focal length f1 of the first lens 15 may be larger than the focal length f2 of the second lens 16. If the adjustment between the optical axis C2 of the first lens 15 and the optical axis Ca of the optical waveguide 6 is difficult, a decrease in optical coupling efficiency may be suppressed by enlarging the focal length f1 of the first lens 15.

Example

Figure 8:
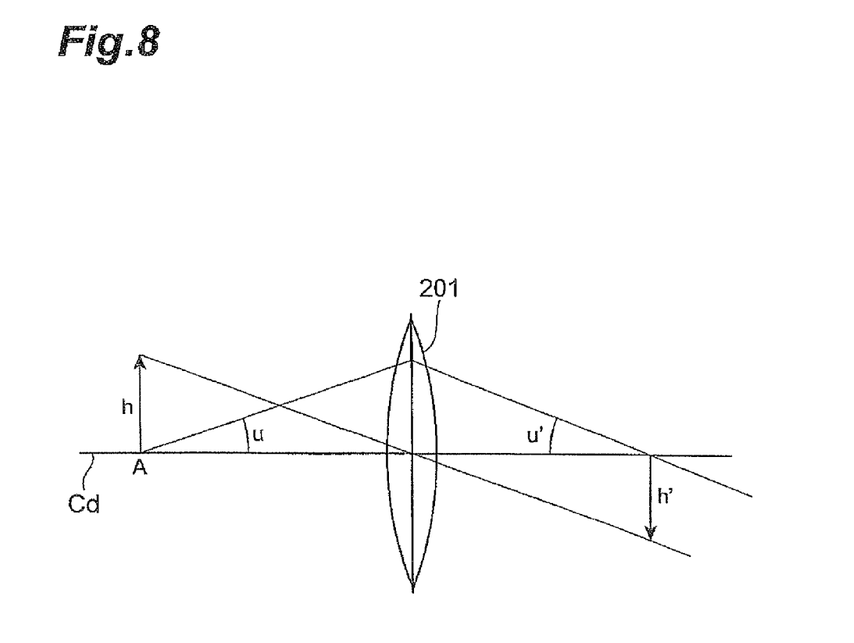
FIG. 8 illustrates one example of an optical system including a lens.

An example of the shape and size of the optical waveguide 6 is described. FIG. 8 illustrates an optical system including a certain lens 201. When an object A of height h is formed as an image of height H', the image formation magnification (lateral magnification) of the lens 201 is expressed as ratio β(=h'/h). Moreover, when an optical beam emitted at angle u from an object point A on an optical axis Cd of the lens 201 is emitted at angle u' from the lens 201, ratio γ(=u'/u) is called an angular magnification. Ratio β and ratio γ satisfy $β_γ=1$ (Helmholtz-Lagrange invariant). Therefore, relationship (1) is established.

[Formula 1]

$$hu=h'u' \quad (1)$$

Figure 9A:
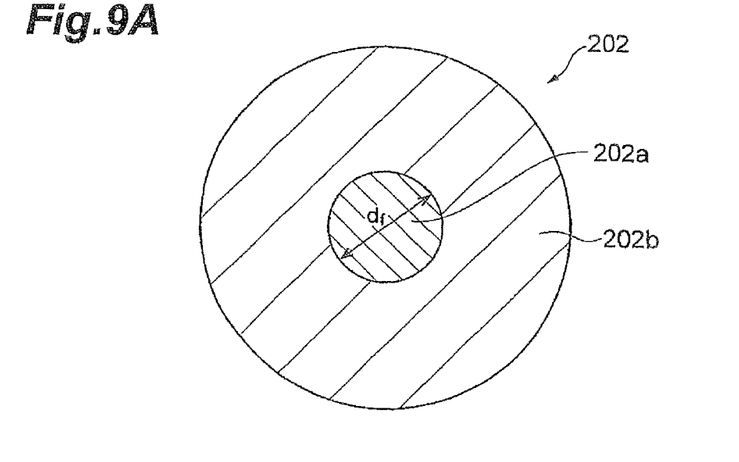
FIG. 9A illustrates a cross section of an optical fiber vertical to an optical axis of the optical fiber.
Figure 9B:
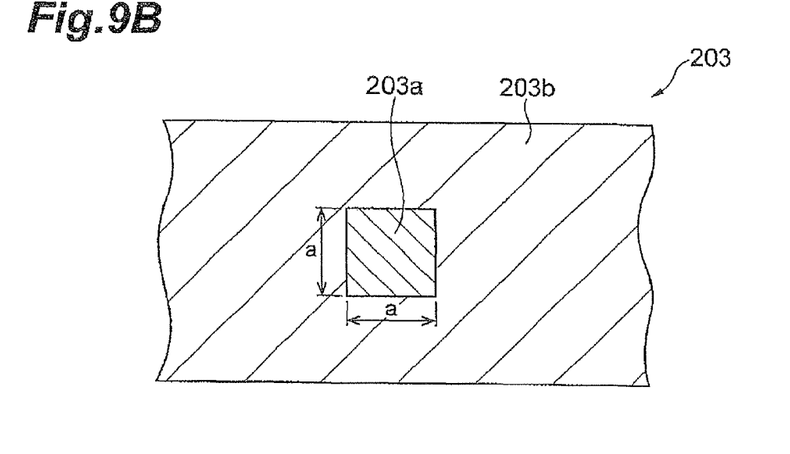
FIG. 9B illustrates a cross section of an optical waveguide vertical to an optical axis of the optical waveguide.

FIG. 9A illustrates a cross section of a certain optical fiber 202 vertical to the optical axis of the certain optical fiber 202. The optical fiber 202 has a core 202a and a clad 202b. The cross section of the core 202a is a circle shape with diameter $d_f$. The divergence angle of a beam emitted from the core 202a is assumed to be $θ_f$. FIG. 9B illustrates a cross section of a certain optical waveguide 203 vertical to the optical axis of the certain optical waveguide 203. The optical waveguide 203 has a core 203a and a clad 203b. The cross section of the core 203a is a square whose length of one side is "a". The divergence angle of a beam emitted from the core 203a is assumed to be $θ_w$. A case where the optical fiber 202 and the optical waveguide 203 are optically coupled through a certain lens is assumed. In the transmission unit, lens lateral magnification $β_1$ may satisfy relationship (2) such that a beam emitted from the core 203a of the optical waveguide 203 is formed within the core 202a of the optical fiber 202.

[Formula 2]

$$\sqrt{2} \times a \times β_1 \leq d_f \quad (2)$$

Lens angular magnification $γ_1$ may satisfy relationship (3) so as to cause a beam emitted at divergence angle $θ_f$ from the core 203a to enter at an incidence angle within the range of NA of the core 202a.

[Formula 3]

$$θ_w \times γ_1 \leq θ_f \quad (3)$$

On the other hand, in the reception unit, lens lateral magnification $β_2$ may satisfy relationship (4) such that a beam emitted from the core 202a of the optical fiber 202 is formed within the core 203a of the optical waveguide 203.

[Formula 4]

$$d_f \times β_2 \leq a \quad (4)$$

Lens angular magnification $γ_2$ may satisfy relationship (5) so as to cause a beam emitted at divergence angle $θ_w$ from the core 202a to enter at an incidence angle within the range of NA of the core 203a.

[Formula 5]

$$θ_f \times γ_2 \leq θ_w \quad (5)$$

Relationship (6) is established by the relationship of the lateral magnification.

[Formula 6]

$$\sqrt{2} \times β_1 \times β_2 \leq 1, \text{ that is, } β_1 \times β_2 \leq \frac{1}{\sqrt{2}} \quad (6)$$

Relationship (7) is established by the relationship of the angular magnification and relationship (1).

[Formula 7]

$$γ_1 \times γ_2 \leq 1, \text{ that is, } β_1 \times β_2 \geq 1 \quad (7)$$

Relationship (6) and relationship (7) cannot be satisfied at the same time. Therefore, since the formed beam protrudes from the core 202a or the core 203a, or the incidence beam is out of the range of NA of the core 202a or the core 203a, a coupling loss increases.

Therefore, the size of the core of the transmitting optical waveguide and the size of the core of the receiving optical waveguide may be made different. The length of one side of the core 61a of the transmitting optical waveguide 61 is set like (8), with an assumption that the length of one side of the core 62a of the receiving optical waveguide 62 is "a".

[Formula 8]

$$\frac{a}{\sqrt{2}} \quad (8)$$

Relationship (2) is expressed as relationship (9).

[Formula 9]

$$\sqrt{2} \times \left(\frac{a}{\sqrt{2}}\right) \times β_1 \leq d_f \quad (9)$$

Relationships (3) to (5) are also applied to the transmitting optical waveguide 61 and the receiving optical waveguide 62.

Taking into account relationship (7), the first lens 15a on the transmission side and the first lens 15b on the reception side may be assumed to be the same and the second lens 16a on the transmission side and the second lens 16b on the reception side may be assumed to be the same, such that the product of lateral magnification $β_1$ and lateral magnification $β_2$ becomes 1. By this means, it is possible to satisfy relationships (3) to (5) and (9) at the same time and reduce a coupling loss. Specifically, since $β_1=d_f/a(=1/β_2)$ and $γ_1=θ_f/θ_w(=1/γ_2)$ are established and $β_1=γ_1$ is established, the length of one side of the cores 61a and 62a may be set so as to be $a=d_f \times θ_f/θ_w$. Length "a" of one side of the core 62a may be equal to or larger than diameter d1 of the core of the receiving optical fiber F, and length √2 times of length a' of one side of the core 61a may be equal to or less than diameter d1 of the core of the transmitting optical fiber F.

The optical connection structure according to the present invention is not limited to the above-mentioned embodiment, and, for example, only any one of the transmission unit and the reception unit may be comprised.

What is claimed is:

1. An optical connection structure comprising:
   a substrate including a main surface and an optical waveguide in which a beam is incident or emitted in a direction intersecting with the main surface;
   a receptacle including a first lens and a connector guide and disposed on the substrate such that the first lens and the optical waveguide are optically coupled; and
   an optical connector including a second lens and a guide unit and holding an optical fiber so as to be optically coupled with the second lens, wherein:

the receptacle and the optical connector are configured to be detachable through the connector guide and the guide unit; and the first lens and the second lens are optically coupled by mounting the optical connector to the receptacle, wherein the optical connector comprises:

a front surface on which the second lens is disposed; and a rear surface opposing the front surface and to which the optical fiber is introduced.

2. The optical connection structure according to claim 1, wherein:

the first lens receives a beam emitted from the optical waveguide, collimates the beam, and emits the beam to the second lens; and the second lens receives the beam emitted from the first lens, converges the beam, and couples the beam to the optical fiber.

3. The optical connection structure according to claim 2, wherein a gap between an optical axis of the optical waveguide and an optical axis of the first lens is equal to or less than 5 μm.

4. The optical connection structure according to claim 3, wherein a focal length of the first lens is larger than a focal length of the second lens.

5. The optical connection structure according to claim 1, wherein:

the second lens receives a beam emitted from the optical fiber, collimates the beam, and emits the beam to the first lens; and the first lens receives the beam emitted from the second lens, converges the beam, and couples the beam to the optical waveguide.

6. The optical connection structure according to claim 1, wherein, when the optical connector is mounted to the receptacle, a gap between an optical axis of the first lens and an optical axis of the second lens is equal to or greater than 3 μm and equal to or less than 20 μm.

7. The optical connection structure according to claim 6, wherein a focal length of the second lens is larger than a focal length of the first lens.

8. An optical connection structure comprising:

a substrate including a main surface, a receiving optical waveguide in which a reception beam is incident in a direction intersecting with the main surface, a transmitting optical waveguide in which a transmission beam is emitted in the direction intersecting with the main surface, a light receiving element receiving the reception beam from the receiving optical waveguide, and a light emitting element providing the transmission beam to the transmitting optical waveguide;

a receptacle including a receiving first lens, a transmitting first lens, and a connector guide and disposed on the substrate such that the receiving first lens is optically coupled with the receiving optical waveguide and the transmitting first lens is optically coupled with the transmitting optical waveguide; and an optical connector including a receiving second lens, a transmitting second lens, and a guide unit, holding a receiving optical fiber so as to be optically coupled with the receiving second lens, and holding a transmitting optical fiber so as to be optically coupled with the transmitting second lens, wherein:

the receptacle and the optical connector are configured to be detachable through the connector guide and the guide unit; and by mounting the optical connector to the receptacle, the receiving first lens and the receiving second lens are optically coupled and the transmitting first lens and the transmitting second lens are optically coupled, wherein the optical connector comprises:

a front surface on which the second lens is disposed; and a rear surface opposing the front surface and to which the optical fiber is introduced.

9. The optical connection structure according to claim 8, wherein:

a numerical aperture of the transmitting optical waveguide and a numerical aperture of the receiving optical waveguide are substantially equal;

a numerical aperture of the transmitting optical fiber and a numerical aperture of the receiving optical fiber are substantially equal;

a focal length of the transmitting first lens and a focal length of the receiving first lens are substantially equal; and a focal length of the transmitting second lens and a focal length of the receiving second lens are substantially equal.

10. The optical connection structure according to claim 9, wherein:

cross sections of a core of the receiving optical waveguide and a core of the transmitting optical waveguide are square;

length of one side of the core of the receiving optical waveguide is equal to a diameter of the core of the receiving optical fiber or greater than the diameter; and length √2 times of one side of the core of the transmitting optical waveguide is equal to a diameter of the core of the transmitting optical fiber or less than the diameter.

* * * * *